(12) United States Patent
Jalali et al.

(10) Patent No.: US 12,206,455 B1
(45) Date of Patent: *Jan. 21, 2025

(54) WAVELENGTH-MULTIPLEXED SUBRANGING ELECTRO-OPTIC MODULATOR (SEOM) FOR HIGH DYNAMIC RANGE APPLICATIONS

(71) Applicant: SEAFORD HOLDINGS, LLC, El Segundo, CA (US)

(72) Inventors: Bahram Jalali, Los Angeles, CA (US); William R Ryan, Los Angeles, CA (US)

(73) Assignee: Seaford Holdings, LLC, El Segundo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/585,565

(22) Filed: Feb. 23, 2024

Related U.S. Application Data

(63) Continuation of application No. 18/238,801, filed on Aug. 28, 2023, now Pat. No. 11,916,595.

(51) Int. Cl.
| | |
|---|---|
| *H04J 14/02* | (2006.01) |
| *H04B 10/2543* | (2013.01) |
| *H04B 10/2575* | (2013.01) |
| *H04B 10/50* | (2013.01) |
| *H04B 10/58* | (2013.01) |

(52) U.S. Cl.
CPC ...... *H04B 10/2543* (2013.01); *H04J 14/0307* (2023.08); *H04B 10/2575* (2013.01); *H04B 10/505* (2013.01); *H04B 10/5053* (2013.01); *H04B 10/50575* (2013.01); *H04B 10/50595* (2013.01); *H04B 10/58* (2013.01); *H04B 2210/075* (2013.01); *H04J 14/02* (2013.01); *H04J 14/0279* (2013.01)

(58) Field of Classification Search
CPC ............ H04B 10/2543; H04B 10/2575; H04B 10/505; H04B 10/5053; H04B 10/50575; H04B 10/50595; H04B 10/58; H04B 2210/075; H04J 14/0307; H04J 14/02; H04J 14/0279
USPC .................... 398/43–103, 115–117, 182–201
See application file for complete search history.

(56) References Cited

U.S. PATENT DOCUMENTS

| | | | | |
|---|---|---|---|---|
| 5,054,875 | A | * 10/1991 | Curran ............... | H04B 10/2581 385/27 |
| 5,162,937 | A | * 11/1992 | Heidemann ......... | H04J 14/0298 398/79 |

(Continued)

*Primary Examiner* — Dibson J Sanchez

(57) ABSTRACT

Described herein is a solution to address the intrinsic non-linearity of analog signals and the restrictions this places on the signals dynamic range. The subject matter described herein produces linear electro-optic modulation over a dramatically wider range of the input signal amplitude. This is accomplished by a distributed multiwavelength design that "folds" the large dynamic range across multiple linear subranges, with each subrange being addressed using an optical wavelength. As a result, the subrange within the wide dynamic range of the input signal is captured by the linear portion of the transfer function of a single transfer function. Several physical implementations of this subject are presented herein. This innovation enables the efficient use of optical links for the transmission and processing of analog and multilevel signals, overcoming the limitations that were once hindering progress in this field.

13 Claims, 12 Drawing Sheets

(56) References Cited

U.S. PATENT DOCUMENTS

| | | | | |
|---|---|---|---|---|
| 6,046,838 A * | 4/2000 | Kou | .................. | G02F 1/0516 |
| | | | | 359/239 |
| 6,532,320 B1 * | 3/2003 | Kikuchi | .............. | H04J 14/0307 |
| | | | | 385/24 |
| 10,120,127 B1 * | 11/2018 | Williams | ........... | G02B 6/12019 |
| 2004/0013435 A1 * | 1/2004 | Eiselt | .................. | H04B 10/675 |
| | | | | 398/140 |
| 2004/0120708 A1 * | 6/2004 | Hirt | ..................... | H04B 10/506 |
| | | | | 398/26 |
| 2010/0021166 A1 * | 1/2010 | Way | .................... | H04J 14/0256 |
| | | | | 398/79 |
| 2012/0294612 A1 * | 11/2012 | Maeda | ................ | H04J 14/0256 |
| | | | | 398/51 |

* cited by examiner

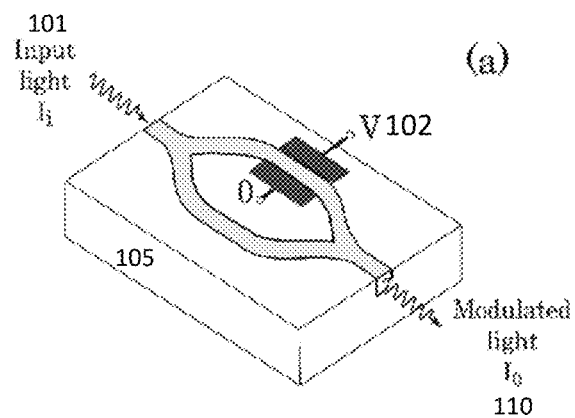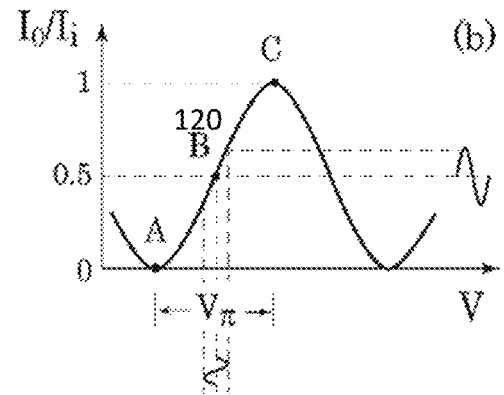
Figure 1A (Prior Art)
FIGURE 1B (Prior Art)

500
Wavelength Biased Virtual Array

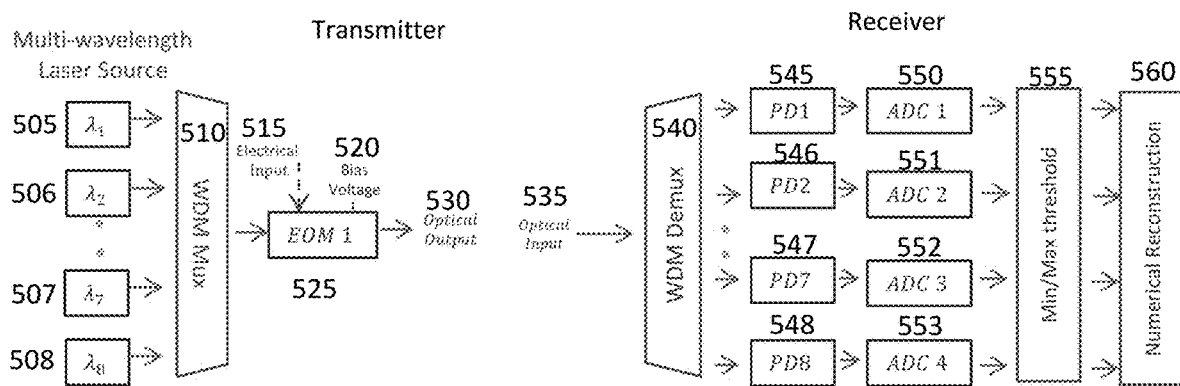

- In this configuration the multiwavelength source feeds a single modulator and the subranging behavior is achieved using the wavelength dependence of the Vpi. In this architecture, the input signal is only applied to a single modulator alleviating the load on the RF driver amplifier.
- The effective bias point is different for each wavelength due to the wavelength dependence of the bias point.
- Differences in the modulation index at each wavelength is corrected in the digital backend before splicing.

FIG. 5A

Digital scaling to compensate for the wavelength dependence of modulation index (added to the receiver)

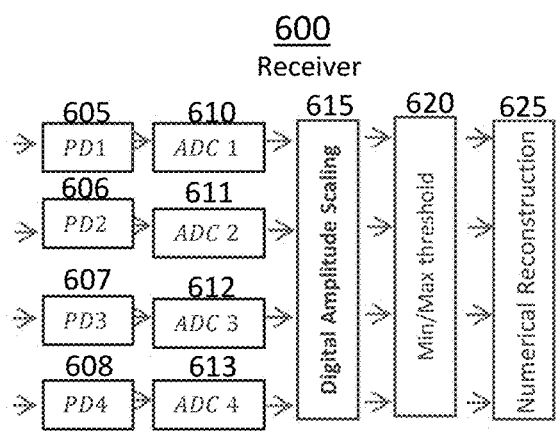

600
Receiver

- Compensates for the wavelength dependence of the modulation index by adjusting the amplitude of each channel in the digital domain
- This implementation only changes the receiver.
- This receiver can be used with various implementations of the transmitter including serial, parallel and virtual array.

FIG. 6

Numerical linearization in the digital backend (added to the receiver)

700

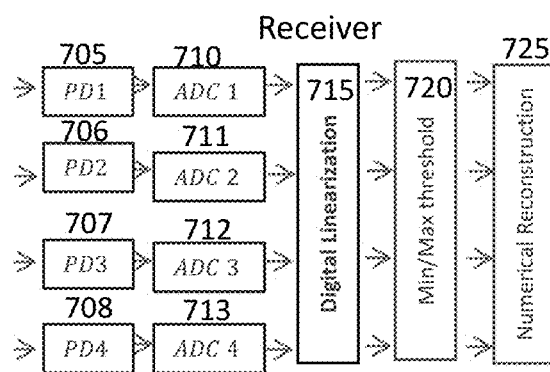

- To achieve further dynamic range enhancement, each modulator's output is linearized in the digital domain before thresholding and splicing.
- This implementation only changes the receiver.
- This receiver can be used with various implementations of the transmitter including serial, parallel and virtual array.

FIG. 7

Combination of scaling and linearization in the digital backend (added to the receiver)

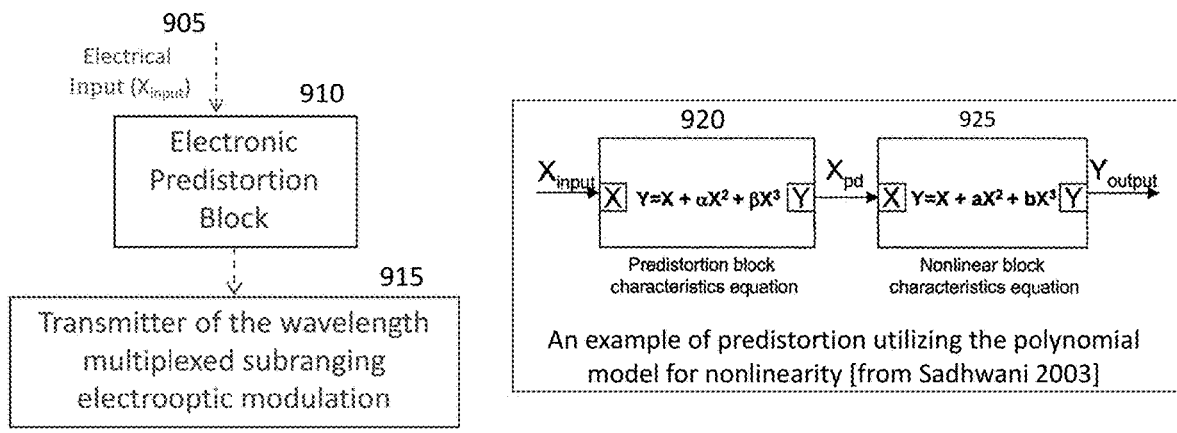

Figure: Combination with electronic predistortion. Left: the performance of the subject subranging electrooptic modulator can be enhanced by combining it with electronic predistortion. Right: a simplified example of how a predistortion linearizer can be implemented using polynomial approximations for both the predistortion block and the nonlinear device (electrooptic modulator) that is to be linearized. The figure on the right is from [Sadhwani 2003].

Figure 9

WAVELENGTH-MULTIPLEXED SUBRANGING ELECTRO-OPTIC MODULATOR (SEOM) FOR HIGH DYNAMIC RANGE APPLICATIONS

CROSS-REFERENCE TO RELATED APPLICATIONS/INCORPORATION BY REFERENCE

This application claims priority to and is a continuation of U.S. non-provisional patent application Ser. No. 18/238,801, filed Aug. 28, 2023, entitled "WAVELENGTH-MULTIPLEXED SUBRANGING ELECTRO-OPTIC MODULATOR (SEOM) FOR HIGH DYNAMIC RANGE APPLICATIONS," the disclosure of which is hereby incorporated by reference.

FIELD OF TECHNOLOGY

The field of the technology is related to wavelength-multiplexed subranging electro-optical modulators for high dynamic range applications.

BACKGROUND

While electronic systems have been the primary choice for computing, there are distinct advantages in using optics to connect computers and sensors together. Acting as a critical bridge between electronic computing and optical communication, electrooptic modulation plays a pivotal role. A key limitation of these modulators lies in their nonlinearity, which arises from the sinusoidal transfer function—a characteristic of the interference phenomenon utilized in these devices. Unfortunately, this intrinsic nonlinearity poses restrictions on the signal dynamic range and hampers the transmission and processing of analog signals.

BRIEF SUMMARY OF THE DISCLOSURE

Described herein is a breakthrough solution to address this fundamental issue of non-linearity in the electrooptic modulators. The subject matter described herein produces linear electro-optic modulation over a dramatically wider range of the input signal amplitude. This is accomplished by a distributed electrooptic modulation architecture that "folds" the large dynamic range of the input signal across multiple linear subranges, with each subrange being addressed using a unique optical wavelength. As a result, the subrange within the wide dynamic range of the input signal is captured by the linear portion of the transfer function of a single transfer function, thereby dramatically increasing the total linear dynamic range of the electrooptic modulator.

These and other advantages, aspects and novel features of the present disclosure, as well as details of an illustrated embodiment thereof, will be more fully understood from the following description and drawings. For example, the distributed nature of the invention also overcomes the problems caused by saturation of the photodetector at high optical powers which are needed to achieve high dynamic range and high signal to noise ratio in electrooptic links.

BRIEF DESCRIPTION OF DRAWINGS

FIG. 1A illustrates a simple Mach-Zehnder electrooptic modulator and its sinusoidal input-output relation (transfer function).

FIG. 1B illustrates the electrooptic modulator's input output characteristic.

FIG. 5A illustrates a SEOM system including a virtual array according to exemplary embodiments.

FIG. 6 is a block diagram of a amplitude scaling module utilized in an SEOM system according to exemplary embodiments.

FIG. 7 is a block diagram of a digital linearization module utilized in an SEOM system according to exemplary embodiments; FIG. 9 illustrates a predistortion module in a SEOM system according to exemplary embodiments.

DETAILED DESCRIPTION OF THE DISCLOSURE

The following detailed description provides a better understanding of the features and advantages of the inventions described in the present disclosure in accordance with the embodiments disclosed herein. Several physical implementations of this idea are presented. This innovation enables the efficient use of optical links for the transmission and processing of analog and multi-level digital signals, overcoming the limitations that were once hindering progress in this field.

In the following description, reference is made to the accompanying drawings, which form a part hereof, and in which is shown, by way of illustration, various embodiments of the present disclosure.

FIG. 1A illustrates a simple Mach-Zehnder electrooptic modulator. FIG. 1B illustrates the sinusoidal input-output relation (transfer function). The half wave voltage is denoted as $V_{pi}$ and B is the operating point known as the quadrature bias point. High performance optical links use the Mach-Zehnder interferometer with an electrooptic phase shifter in one or both arms. The electrooptic function is realized using bulk or thin-film LiNbO3 (Lithium Niobate) to convert the electrical analog or digital date into the optical domain for transport over optical fibers or processing in the optical domain. Mach-Zehnder interferometric modulators can also be realized using semiconductor technologies including Indium Phosphide (InP) and silicon photonics. Mach-Zehnder modulators utilize interference to map the electro-optic phase modulation into an intensity modulated signal that can be detected. The inherent cyclical (sinusoidal) behavior of interference results is a nonlinear conversion between the electrical and optical signals which causes the converted signal to be distorted. In FIG. 1A, an input light $I_i$ 101 is input along with an input electrical signal 102 to a Mach-Zehner electrooptic modulator 105 and a modulated light $I_o$ 110 is output.

FIG. 1B illustrates the electrooptic modulator's input output characteristic. The $I_O/I_i$ ratio value is on one axis and the other axis is the applied electrical signal voltage. The modulator's sinusoidal input output characteristic (transfer function) is due to optical interference between the two arms. The nonlinearity of the modulator's output causes distortion of analog input signals and this is a main bottleneck when using these electrooptic modulators for analog applications. While there does exist a linear regime in the sinusoidal curve, it only extends over a small range around point B 120. This small range limits the dynamic range of the electro-optic modulator 105. The subject matter described herein addresses and solves this problem. It also solves another problem in optical links having to do with the saturation of photodetector in the receiver at high optical powers that are needed to achieve high dynamic range and high signal to noise ratio.

Figure 2:
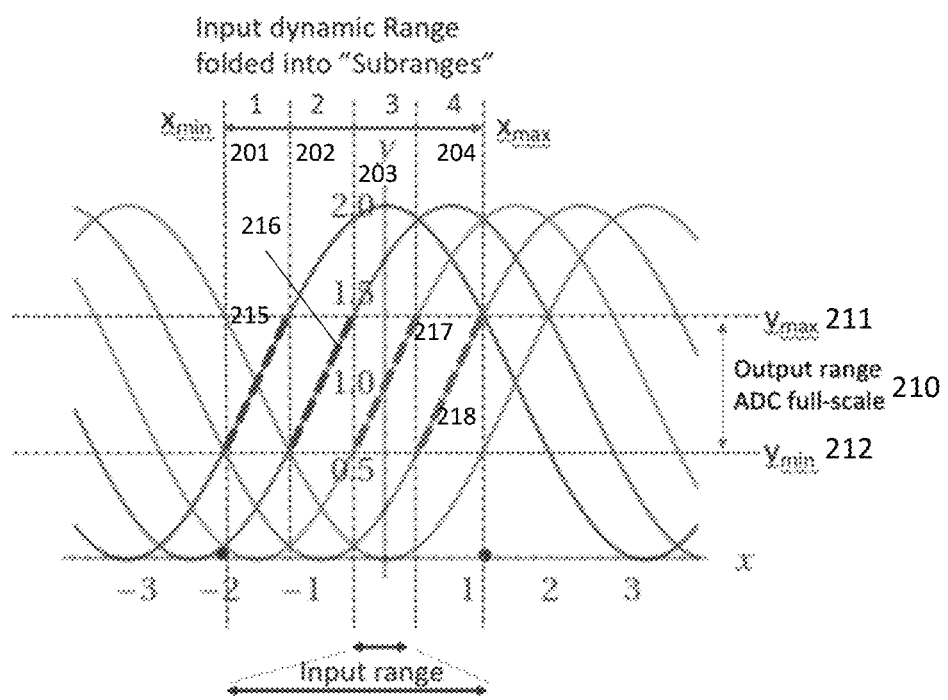
FIG. 2 illustrates how a wide dynamic range input is folded into multiple linear subranges of sinusoidal transfer functions. Each sinusoidal transfer function is addressed by a unique wavelength. The linear subranges within the entire range for each modulator are those that reside between and minimum, y_min, and maximum, y_max, output amplitude range.

FIG. 2 illustrates how a wide dynamic range input is folded into multiple linear subranges where each subrange is addressed by a unique wavelength and spans a subrange of the input according to exemplary embodiments. In FIG. 2, the x axis illustrates a range of input signal folded into four subranges 201, 202, 203, and 204. In exemplary embodiments, the start of the four subranges may be referred to as $x_{min}$ and an end of the four subranges may be referred to as $x_{max}$ 201, 202, 203, and 204. FIG. 2 illustrates an output range 210 of the electrooptic modulator along a y-axis 210. In exemplary embodiments, a linear portion output range 210 may range from $V_{min}$ 211 to $V_{max}$ 212. In exemplary embodiments, the subranges can be identified in multiple ways, for example simply by choosing the output that falls between and a minimum ($y_{min}$) and maximum ($y_{max}$) output threshold values centered about the quadrature point. These values correspond to the start and end points of a linear portion of the transfer function.

The subject matter described herein provides linear electrooptic modulations whereby a wide dynamic range input is folded into multiple subranges where each is addressed via a unique wavelength and spans a subrange of the input. In FIG. 2, there are four linear regions that are depicted by dotted lines 215 216 217 and 218. As illustrated below in FIG. 2, a wavelength multiplexed modulator array may be biased such that an entire range of the input signal is captured by the linear portion of the transfer function of at least one modulator. In exemplary embodiments, an N-channel electro-optic modulator may increase the linear range of the electro-optic modulator by N times. In actual embodiments, the increase in the linear range of the electro-optic modulator may be less than N times in order to facilitate signal reconstruction. In exemplary embodiments, an output signal may be reconstructed in a digital backend by fusing, i.e., splicing, the individual subranges. For higher linearity, a smaller portion of the transfer function of each modulator is used and a larger number of channels may be needed to cover a same input signal range.

As described later, the wavelength multiplexed sub-ranging architecture can be implemented in several ways, which are described in detail below. First, an electro-optic modulator array may be a real physical array consisting of N modulators. Alternatively, an electro-optic modulator may be a virtual array consisting of a single modulator handling multiple N wavelengths. In the latter alternative, the wavelength dependence of bias point may be used to achieve the subranging effect in a single modulator. In both cases, the wavelength dependence of the half wave voltage and the modulation index as well as the photodetector response may be taken into account as discussed later. In some exemplary embodiments, for example, for an N-channel system, the dynamic range, as quantified by the ratio of the linear (first-harmonic) component of the output to the third-harmonic, may increase as $N^2$ in optical domain, and as $N^4$ in the electrical domain. Accordingly, the dynamic range as defined above may therefore increase by $40 \times \log(N)$ in dB scale. This behavior can be seen in the Taylor expansion of the optical transfer function when the modulator is biased at the quadrature point, $V_{p i}/2$. The output power may be varied according to the electrooptic induced optical phase change as, $$y(\phi) = 1 + \cos\left(\phi - \frac{\pi}{2}\right) = 1 + \phi - \frac{\phi^3}{6} + \dots$$

One simple measure of the dynamic range (as set by the intermodulation distortion) is a ratio of the first to third harmonic terms in the Taylor series model of the modulator's output signal. This ratio scales as $6/\phi^2$. In exemplary embodiments, an N channel subranging architecture reduces the phase excursion, $\phi$, by $\phi/N$, hence the optical dynamic range increases as $N^2$ and the electrical dynamic range is enhanced by $N^4$.

In exemplary embodiments, due to the described and claimed subject matter's high dynamic range, the technology described therein may impart Simultaneous Transmit Receive (STAR) capability and spoof resistance to the wideband receiver while faithfully recovering smaller signals in the presence of jammers. Because of the inherent wideband nature of photonics, in exemplary embodiments, the optical link may be an ideal solution for radio frequency (RF) signal processing, including filtering in applications, including but not limited to, FutureG wireless, radio astronomy, antenna remoting and beamforming, electronic warfare signal intelligence (SIGINT) and other signal processing functions.

In exemplary embodiments, RF photonics may provide a link with low loss that can operate at frequencies in the millimeter-wave band. However, the nonlinearity of existing electrooptic modulators severely limits the dynamic range that can be achieved. Exploiting the linear modulator designs described herein with the emerging thin-film LiNbO3 technology, or semiconductor integrated optic technologies, such as InP, GaAs or silicon photonics may make the promise of RF photonics a reality.

In addition to offering a high dynamic range, in exemplary embodiments, the subject SEOM technique for electro-optic modulators may also alleviate the problem of photodetector saturation. Photodetectors saturate at high optical powers that are needed to achieve a link with low loss and high signal to noise ratio. This problem in optical-to-electrical conversion plagues analog optical links and can limit the dynamic range and cause distortion in addition to that caused by the electrooptic conversion in the modulator. In exemplary embodiments of the claimed subject matter, detector saturation may be avoided because each detector of the plurality of photodetectors may see only a fraction 1/N of the total optical power.

In exemplary embodiments, the methods, devices and systems described below may discuss optical communication signals. However, the claimed subject matter is not limited to optical communication signals. In embodiments, the methods, device and systems described herein may be used for wideband signal processing in electronic warfare and countermeasure (SIGINT) and may also be utilized in "FutureG" wireless communication.

Figure 3A:
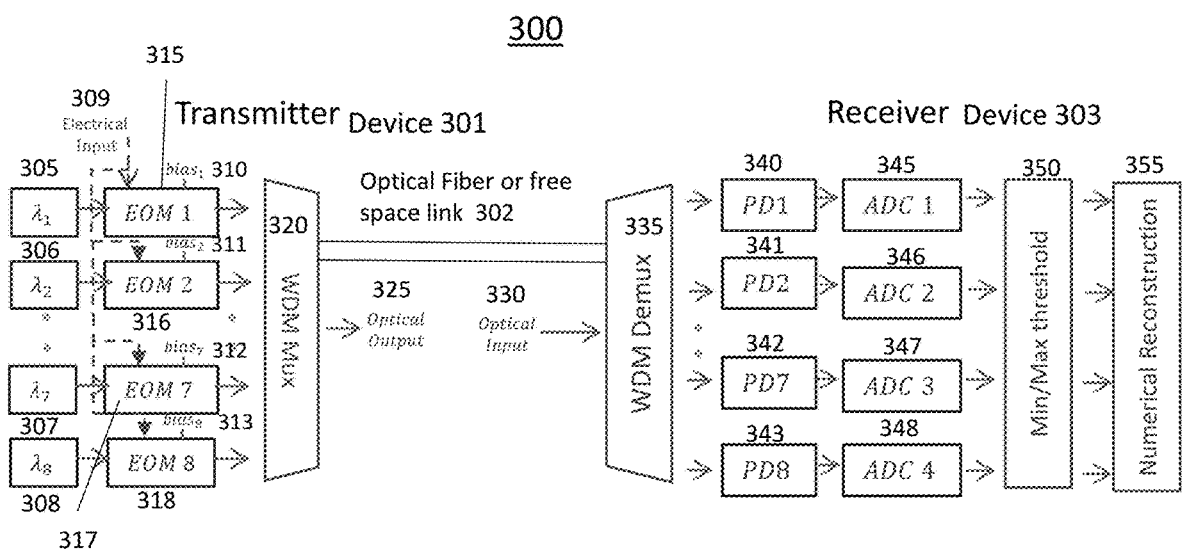
FIG. 3A illustrates an embodiment based on a voltage-biased physical array utilizing Wavelength Division multiplexers (WDMs) and a single optical fiber to implement a wavelength-multiplexed Sub-ranging Electrooptic Modulator (SEOM) system for high dynamic range applications according to some implementations.
Figure 3B:
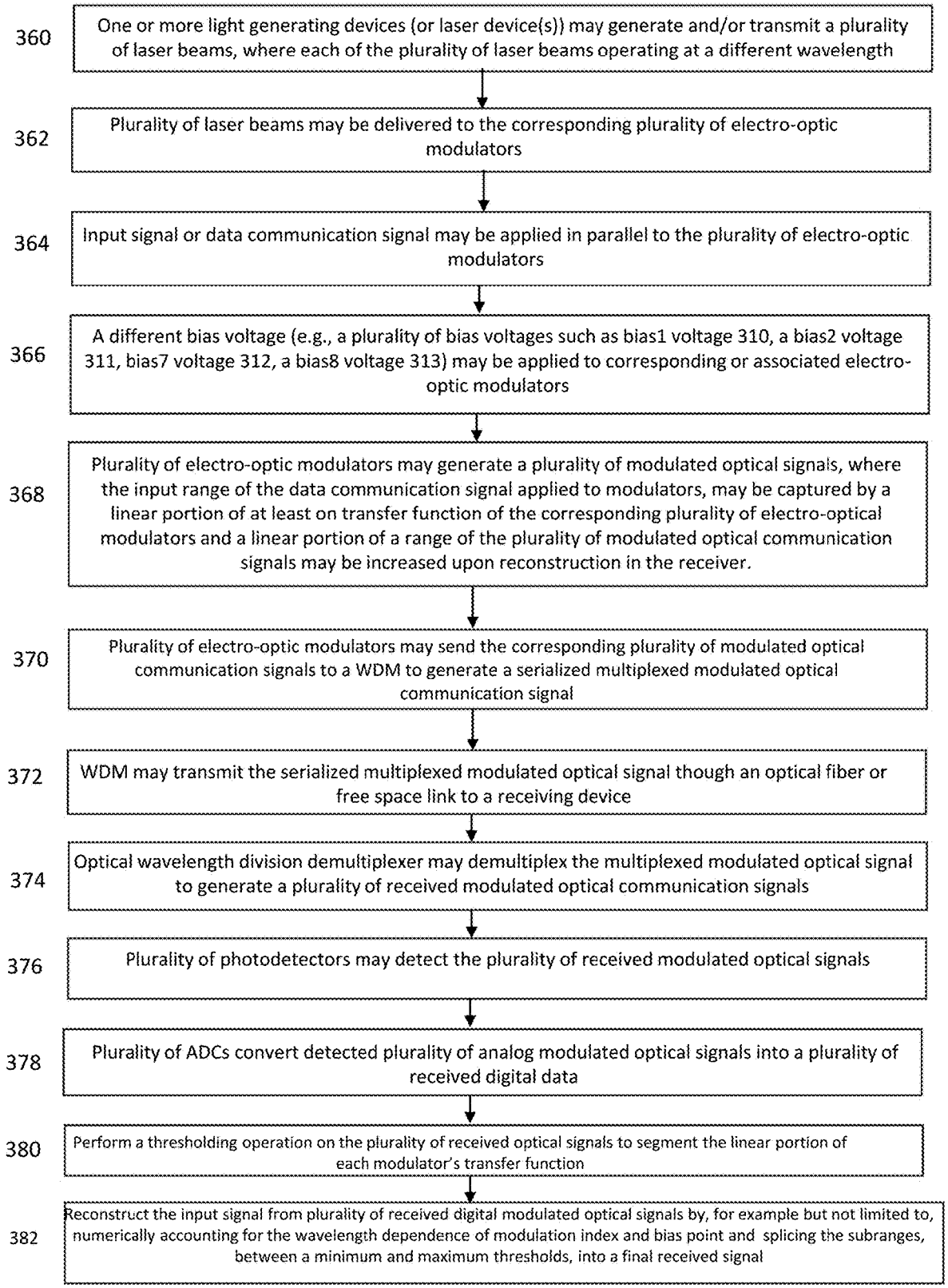
FIG. 3B illustrates a method of flowchart of operating the SEOM system of FIG. 3A according to some implementations.

FIG. 3A illustrates a voltage-biased physical array utilizing a serial system of Wavelength Division multiplexers (WDMs) and a single optical fiber to implement a wavelength-multiplexed Sub-ranging Electrooptic Modulator (SEOM) system for high dynamic range applications according to some implementations. FIG. 3B illustrates a method of flowchart of operating the SEOM system of FIG. 3A according to some implementations. In exemplary embodiments, the sub-ranging architecture may be realized using an N-channel wavelength source and with each wavelength feeding a unique or single modulator. Although FIG. 3A illustrates four channels, the claimed subject matter is not limited to four channels and may be utilized using 2 to 500 channels. As illustrated in FIG. 3A, the SEOM system includes a transmitter device 301, a communication medium such as an optical fiber 302, and/or a receiver apparatus 303. In exemplary embodiments, a transmitter apparatus 301, a plurality of wavelength sources and laser beams having different wavelengths (e.g., $\lambda 1$ 305, $\lambda 2$ 306, $\lambda 7$ 307 and $\lambda 8$ 308); an associated plurality of electro-optic modulators (EOM1 315, EOM2 316, EOM7 317, EOM8 318); an electrical input signal 309 (or data communication symbol), a plurality of bias signals (e.g., $bias_1$ voltage 310, a $bias_2$ voltage 311, $bias_7$ voltage 312, a $bias_8$ voltage 313, and one or more wave-division multiplexers 320. In step 360, in exemplary embodiments, one or more light generating devices (or laser device(s)) may generate and/or transmit a plurality of laser beams, where each of the plurality of laser beams operating at a different wavelength, as illustrated by the wavelengths $\lambda 1$ 305, $\lambda 2$ 306, $\lambda 7$ 307 and $\lambda 8$ 308 in FIG. 3A.

In exemplary embodiments, the plurality of laser beams and associated wavelengths $\lambda 1$ 305, $\lambda 2$ 306, $\lambda 7$ 307 and $\lambda 8$ 308 may be communicatively coupled or connected to a corresponding or associated plurality of electro-optic modulators (EOM1 315, EOM2 316, EOM7 317, EOM8 318). In step 362, the plurality of laser beams may be delivered to the corresponding plurality of electro-optic modulators EOM1 315, EOM2 316, EOM7 317, EOM8 318.

In exemplary embodiments, an input signal generator may be communicatively coupled and/or connected to the plurality of electro-optic modulators EOM1 315, EOM2 316, EOM7 317, EOM8 318. In step 364, an input signal or data communication signal 309 may be applied in parallel to the plurality of electro-optic modulators EOM1 315, EOM2 316, EOM7 317, and/or EOM8 318.

In exemplary embodiments, a bias voltage generator may be communicatively coupled and/or connected to the plurality of electro-optic modulators EOM1 315, EOM2 316, EOM7 317, EOM8 318. In step 366, a different bias voltage (e.g., a plurality of bias voltages such as $bias_1$ voltage 310, a $bias_2$ voltage 311, $bias_7$ voltage 312, a $bias_8$ voltage 313) may be applied to corresponding or associated electro-optic modulators (EOM1 315, EOM2 316, EOM7 317, EOM8 318). In some implementations, each of the electro-optical modulators may be biased at a different DC voltage (e.g., $bias_1$ voltage 310, a $bias_2$ voltage 311, $bias_7$ voltage 312, a $bias_8$ voltage 313) so that a linear region (and hence a quadrature point) of the transfer function may be shifted for the corresponding wavelength or by a certain amount.

In some implementations, the transmitter section 301 may also include an optional bias control circuitry (not shown). In exemplary embodiments, the bias control circuitry may be communicatively coupled to the bias voltage generator. In some implementations, an optional bias control circuitry may monitor a $2^{nd}$ harmonic of an radiofrequency (RF) pilot tone to maintain each electro-optic modulator of the plurality of electro-optic modulators (EOM1 315, EOM2 316, EOM7 317, EOM8 318) at its desired quadrature bias point at the center of its linear regime.

In step 368, in exemplary embodiments, the plurality of electro-optic modulators may generate a plurality of modulated optical communication signals, based at least in part on the plurality of voltage bias signals and the plurality of wavelength. In some implementations, an input range of the data communication signal may be captured by a linear portion of a transfer function of the corresponding plurality of electro-optical modulators and a linear portion of a range of the plurality of modulated optical communication signals may be increased due to the number of the corresponding plurality of electro-optical modulators (e.g., the linear range may be increased by up to three (3) times if three electro-optical modulators are utilized in the transmitter section 301 the SEOM system 300.

In exemplary embodiments, the plurality of electro-optic modulators may be EOM1 315, EOM2 316, EOM7 317, EOM8 318 may be communicatively coupled and/or connected to a wavelength division multiplexer 320. In step 370, in exemplary embodiments, the plurality of electro-optic modulators may send the corresponding plurality of modulated optical communication signals to a wavelength division multiplexer 320 to generate a multiplexed serialized modulated optical communication signal.

In exemplary embodiments, the wavelength division multiplexer 320 may be communicatively coupled and/or connected to an optical fiber (not shown). Alternatively, the multiplexed light (or modulated optical communication signal) may be sent over free space to be received at the receiver by utilizing free space optics (FSO) which may also be referred to as a free space link. In step 372, in exemplary embodiments, the wavelength divisional multiplexer 320 may transmit the multiplexed modulated optical communication signal (e.g., the optical output 325) though an optical fiber 302 or the free space optical link to a receiving device 303.

In exemplary embodiments, the SEOM system 300 may include a receiver device 302. In exemplary embodiments, the receiver device 302 may include a wavelength division demultiplexer 335 to demultiplex the multiplexed modulated optical communication signal to generate a plurality of received modulated optical communication signals; a plurality of photo detectors (e.g., PD1 340, PD2 341, PD7 342 and PD8 343); a plurality of analog-to-digital controllers ADC1 345, ADC2 346, ADC3 347, ADC4 348; a minimum maximum thresholding subsystem 350 and a signal reconstruction subsystem 355 that may numerically splice the subranges together to recreate the large dynamic range input signal. In step 374, in exemplary embodiments, the optical wavelength division demultiplexer 335 may demultiplex the multiplexed modulated optical communication signal to generate a plurality of received modulated optical communication signals.

In exemplary embodiments, the WDM 335 may be communicatively coupled and/or connected to a plurality of photo detectors PD1 340, PD2 341, PD7 342 and PD8 343. In step 376, in exemplary embodiments, the plurality of photodetectors (e.g., PD1 340, PD2 341, PD7 342 and PD8 343) may detect the plurality of received modulated optical communication signals.

In exemplary embodiments, the plurality of photodetectors PD1 340, PD2 341, PD7 342 and PD8 343 may be communicatively coupled and/or connected to a corresponding plurality of analog-to-digital controllers (ADCs) ADC1 345, ADC2 346, ADC3 347, ADC4 348. In step 378, in exemplary embodiments, the plurality of ADCs ADC1 345, ADC2 346, ADC3 347, ADC4 348 may convert the detected plurality of detected and received analog or multi-level modulated optical communication signals into a plurality of received digital modulated optical communication signals.

In exemplary embodiments, the min/max thresholding device 350 may be communicatively coupled and/or connected to the plurality of ADCs (e.g., ADC1 345, ADC2 346, ADC3 347, ADC4 348). In step 380, in exemplary embodiments, the min/max thresholding device 350 may perform a threshold operation on the plurality of the received digital modulated optical communication signals to identify a range between a minimum and a maximum wherein the range corresponds to the linear portion of the transfer function of the electro-optic modulators. The min/max thresholding device 350 may be preceded by digital adjustment of the plurality of signals to account for the wavelength dependence of the modulator's half wave voltage, the modulation index, and the photodetector response. Alternatively, each modulator may feature a wavelength insensitive design.

In exemplary embodiments, the min/max thresholding device 350 may be communicatively coupled to the reconstruction algorithm 355 performing numerical splicing of various subranges. In step 382, in exemplary embodiments, the numerical splicing algorithm 355 performed on a digital processor may splice or fuse the plurality of received digital modulated optical communication signals into a final received signal, wherein the final received signal spans the linear portion of each electro-optic modulator. In some implementations, the final received signal may be an optical communication signal and in others it may be a communication signal.

Optionally, in some exemplary embodiments, a bias control circuitry may be used to maintain a stable bias point for each modulator. The bias control mechanism may use a radiofrequency (RF) pilot tone and its second harmonic as a measure of the deviation of the bias away from the desired quadrature bias. In some implementations, the pilot tone may reside on another wavelength channel in order to prevent pilot-signal interference.

Figure 4A:
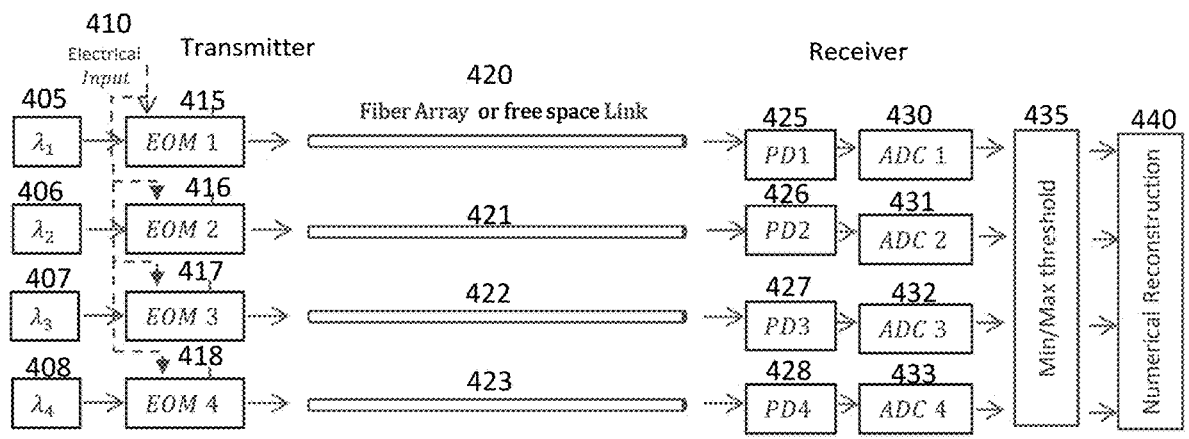
FIG. 4A illustrates an alternative embodiment of the SEOM system utilizing a parallel architecture and a fiber array, according to exemplary embodiments.
Figure 4B:
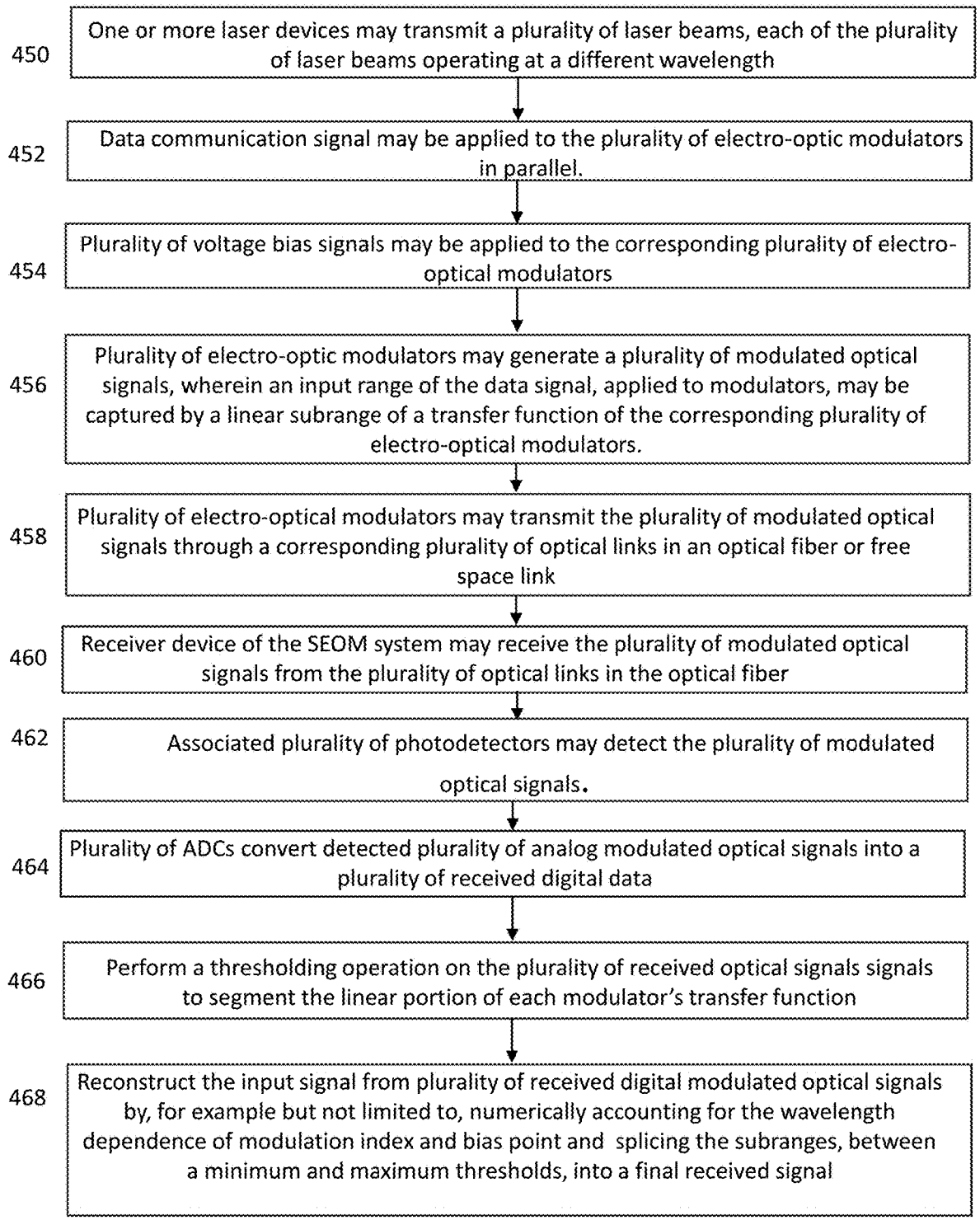
FIG. 4B illustrates a flowchart of operation of a parallel architecture and optical fiber array according to exemplary embodiments.

In some circumstances, inter-channel cross talk in the WDM multiplexer/demultiplexer may limit the performance of SEOM system and/or the optical fiber link described with respect to FIGS. 3A and 3B. FIG. 4A illustrates an alternative embodiment of a SEOM system that avoids the WDM multiplexer/demultiplexer by utilizing a parallel architecture and a fiber array, according to exemplary embodiments. FIG. 4B illustrates a flowchart of operation of a parallel architecture and optical fiber array, according to exemplary embodiments. In exemplary embodiments, the inter-channel cross-talk problem or issue may be eliminated by removing the multiplexer 320 (FIG. 3) and the demultiplexer 335 (FIG. 3) and instead using a fiber array or a plurality of optical fibers or optical fiber strands to carry the signals from each electrooptic modulator (EOM) to the respective receiver device channel via a separate and unique fiber. In some implementations, the signals may be sent over free space using free space optics (or an optical link).

As illustrated in FIG. 4A, the SEOM system 400 may include a transmitter device 401 and a receiver device 402. In exemplary embodiments, the transmitter device 401 may include one or more laser devices may generate a plurality of laser beams, each of the plurality of laser beams operating at a different wavelength as illustrated by $\lambda 1$ 405, $\lambda 2$ 406, $\lambda 3$ 407 and $\lambda 4$ 08 in FIG. 4A; a data communication signal or electrical input signal 410, a plurality of electro-optic modulators EOM1 415, EOM2 416, EOM3 417, and EOM4 418.

In exemplary embodiments, the one or more laser devices may be communicatively coupled and/or connected to the plurality of electro-optic modulators EOM1 415, EOM2 416, EOM3 417, and EOM4 418. In step 450, in exemplary embodiments, the one or more laser devices may transmit a plurality of laser beams, each of the plurality of laser beams operating at a different wavelength.

In exemplary embodiments, a data transmission device may be communicatively coupled and/or connected to the plurality of electro-optic modulators EOM1 415, EOM2 416, EOM3 417, and EOM4 418 in a parallel manner. In step 452, in exemplary embodiments, the data communication signal or electrical input signal 410 may be applied to the plurality of electro-optic modulators in parallel.

In exemplary embodiments, a voltage bias generator may be communicatively coupled and/or connected to the plurality of electro-optic modulators EOM1 415, EOM2 416, EOM3 417, and EOM4 418. In step 454, in exemplary embodiments, a plurality of voltage bias signals 411 may be applied to the corresponding plurality of electro-optical modulators.

In step 456, the plurality of electro-optic modulators EOM1 415, EOM2 416, EOM3 417, and EOM4 418 may generate a plurality of modulated optical communication signals based at least in part on the plurality of laser beam wavelengths, wherein an input range of the data communication signal may be captured by a linear portion of a transfer function of the corresponding plurality of electro-optical modulators. In these implementations, a linear portion of a range of the plurality of modulated optical communication signals may be increased due to a number of the corresponding plurality of electro-optical modulators.

In exemplary embodiments, the plurality of electro-optic modulators EOM1 415, EOM2 416, EOM3 417, and EOM4 418 may be communicatively coupled and/or connected a plurality of optical links 420 421 422 and 423 in the optical fiber or free space optical link. In other words, a separate optical fiber may be coupled or connected to each of the plurality of EOMs (e.g., EOM1 415, EOM2 416, EOM3 417, and EOM4 418). In step 458, in exemplary embodiments, the plurality of electro-optical modulators may transmit the plurality of modulated optical communication signals through a corresponding plurality of optical links 420 421 422 and 423 in an optical fiber or may transmit the plurality of modulated optical communication signals utilizing free space optics through a free space optical link.

In exemplary embodiments, the receiver device 402 may include a plurality of photodetectors 425 426 427 and 428, a plurality of analog-to-digital converters (ADCs) 430 431 432 and 433, a thresholding device/module 435, and/or a fusion stitching device/module. In step 460, in exemplary embodiments, the receiver device 402 of the SEOM system 400 may receive the plurality of modulated optical signals from the plurality of optical links 420 421 422 and 423 in the optical fiber (or the plurality of free space optical links).

In exemplary embodiments, the plurality of optical links 420 421 422 423 may be communicatively coupled and/or connected to the plurality of photodetectors 425 426 427 and 428. In step 462, in exemplary embodiments, the corresponding or associated plurality of photodetectors may detect the plurality of modulated optical communication signals.

In exemplary embodiments, the plurality of ADCs 430 431 432 and 433 may be communicatively coupled to a corresponding one of the plurality of photodetectors 425 426 427 and 428. In step 464, in exemplary embodiments, the plurality of ADCs may convert the detected plurality of received analog modulated optical communication signals into a plurality of received digital modulated optical communication signals.

In exemplary embodiments, a thresholding module 435 may be communicatively coupled and/or connected to the plurality of ADCs 430 431 432 and 433. In step 466, in exemplary embodiments, a thresholding module 435 may perform a threshold operation on the plurality of digital modulated optical communication signals to identify a range between a minimum value and a maximum value, wherein the range corresponds to the linear portion of the transfer function of the electro-optic modulators.

In exemplary embodiments, a signal reconstruction module 440 performing, for example, splicing of different subranges may be communicatively coupled and/or connected to the thresholding module 435. In step 468, in exemplary embodiments, the splicing module may splice or fuse the received plurality of digital modulated optical communication signals into a final received signal, wherein the final received signal may span the linear portion of each electro-optic modulator of the plurality of electro-optical modulators. In some implementations, the final received signal may be a communication signal or alternatively an optical communication signal.

In the exemplary embodiments illustrated in FIGS. 4A and 4B, it should be noted that the half wave voltage $V_\pi$, depends on the optical wavelength, $\lambda$. This renders both the bias point and the modulation index wavelength dependent. In some implementation, typical dependencies, $dV_\pi/d\lambda$, may range from 8 V/μm (volt per micron of wavelength change) for a LiNbO3 modulator to 2.5 V/μm for a polymer modulator. Additionally, the modulation index (also called the modulation depth) may also vary with wavelength. Because of these dependencies on wavelength, the SEOM system subranging architecture may need to address this.

The wavelength dependence of a half wave voltage may be computed using the known relations for a Mach Zehnder modulator. The half wave voltage may be calculated by:

$$V_\pi(\lambda) = \frac{\lambda d}{2\Gamma(\lambda)n^3(\lambda)r(\lambda)L_m}$$

Where $\lambda$ is the optical wavelength;
d is the electrode spacing;
L_m is the electrode length;
$\Gamma(\lambda)$ is the confinement factor;
$n(\lambda)$ is the index of refraction; and
$r(\lambda)$ is the electrooptic coefficient.
The modulation index may be defined as $$m(\lambda) = \pi \frac{V_{in}}{V_\pi(\lambda)}$$

The variation of half wave voltage, $\Delta V_\pi$, with wavelength can be computed as $$\Delta V_\pi = \left(\frac{dV_\pi}{d\lambda}\right)\Delta\lambda.$$

This relation can be used to adjust the bias voltages applied to the plurality of modulators and also to adjust the modulation depth. The latter be done in the analog frontend by adjusting the amplitude of the input analog signals applied to the modulator. It can also be done in the digital backend by scaling the amplitude of each channel before thresholding and signal reconstruction.

Figure 5B:
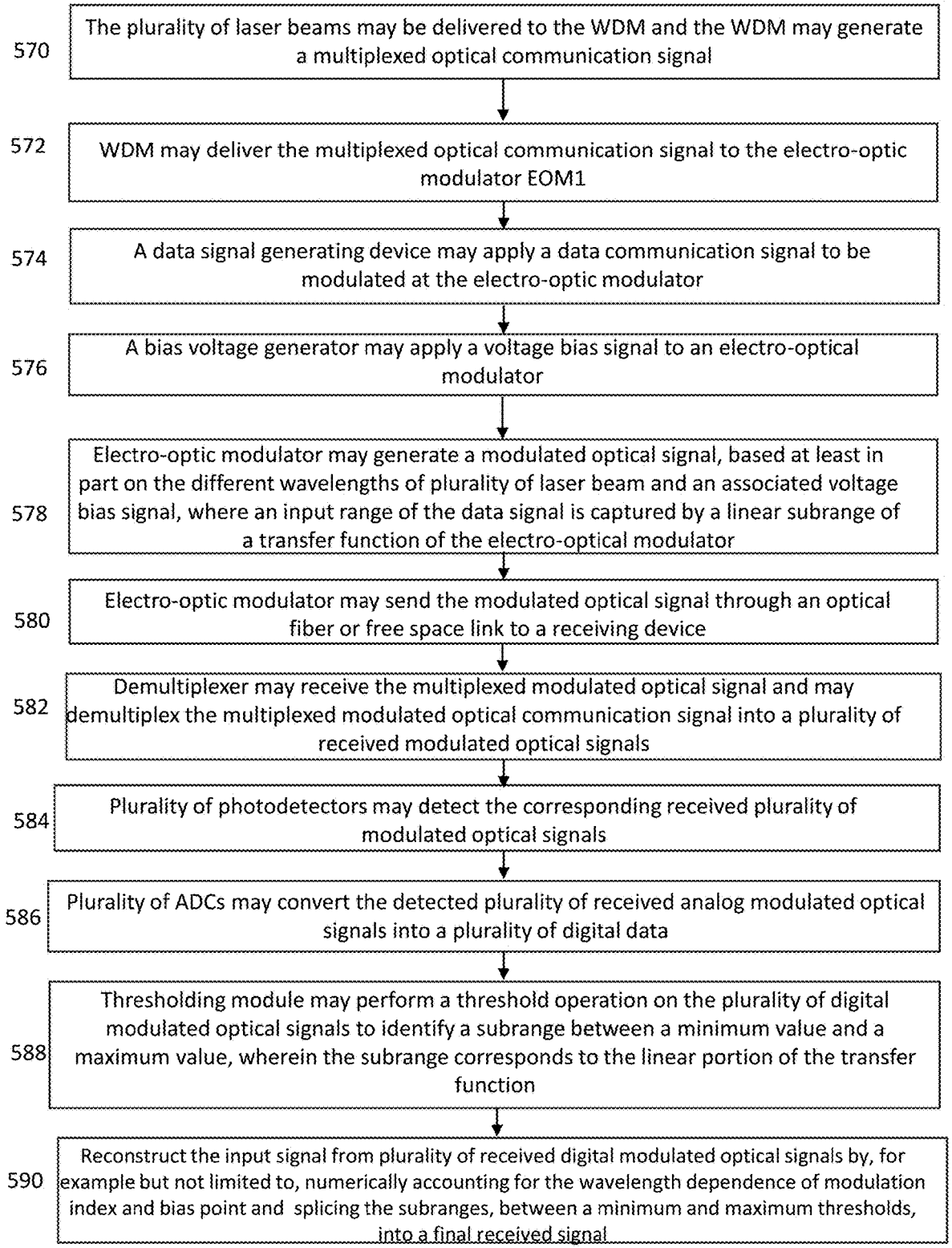
FIG. 5B is a flowchart illustrating operation of the SEOM system including a virtual array according to exemplary embodiments.

FIG. 5A illustrates a SEOM system including a virtual array according to exemplary embodiments. FIG. 5B is a flowchart illustrating operation of the SEOM system including a virtual array according to exemplary embodiments. In the configuration illustrated in FIGS. 5A and 5B, the multiwavelength source (e.g., laser source) may feed a single electro-optic modulator and a subranging behavior may be achieved using the wavelength dependence of the modulator's transfer function. In this wavelength-biased embodiment, the single modulator experiences different bias points at each of the N wavelengths. The transfer functions at each wavelength is shifted as if there were N physical modulators each with a different bias voltage. Therefore, one can call this embodiment "wavelength-biased" in contrast to the previous embodiments being "voltage-biased".

The configuration illustrated in FIGS. 5A and 5B may takes advantage of the modulator's transfer function, as parametrized by the "half wave voltage", $V_{pi}$, and the "quadrature point", $V_{pi}/2$, which varies with optical wavelength of the laser beams. In the architecture illustrated in FIG. 5A and described in FIG. 5B, the data communication signal (input signal) may be applied to a single electro-optic modulator alleviating the load on a radio-frequency (RF) driver amplifier. In this implementation, an effective voltage bias point may be different for each wavelength due to a wavelength dependence of the voltage bias point.

As illustrated in FIG. 5A, a SEOM system 500 may include a transmitter device 501, a receiver device 502 and an optical fiber 503. In exemplary embodiments, a transmitter device 501 may include a laser device (or light source) transmitting a plurality of laser beams, each having a different wavelength (e.g., λ1 505, λ2 506, λ7 507 and λ8 508); a wavelength division multiplexer 510, an electro-optic modulator 525, a data communication signal device generating a data communication signal 515, and a bias voltage generating device 520.

In exemplary embodiments, in the transmitter device 501, a multi-wavelength laser source may be communicatively coupled and/or connected to the WDM 510. In step 565, in exemplary embodiments, the multi-wavelength laser source may emit a plurality of laser beams, each of the plurality of laser beams operating at a different wavelength. In step 570, in exemplary embodiments, the plurality of laser beams may be delivered to the WDM 510 and the WDM 510 may generate a multiplexed optical communication signal.

In exemplary embodiments, the WDM 510 may be communicatively coupled and/or connected to an electro-optic modulator (EOM1 525). In step 572, in exemplary embodiments, the WDM 510 may deliver the multiplexed optical communication signal to the electro-optic modulator EOM1 525.

In exemplary embodiments, a data communication signal (or electrical input) 515 may be communicatively coupled and/or connected to the electro-optic modulator EOM1 525. In step 574, in exemplary embodiments, a data signal generating device may apply a data communication signal to be modulated at the electro-optic modulator 525.

In exemplary embodiments, a bias voltage generator may be communicatively coupled or connected to an electro-optic modulator 525. In step 576, in exemplary embodiments, a bias voltage generator may apply a bias voltage 520 to an electro-optical modulator 525. In some implementations, an effective bias voltage point may be different for each different wavelength of the applied plurality of laser beams due to the wavelength dependence of the voltage bias signal.

In step 578, in exemplary embodiments, an electro-optic modulator may generate a modulated optical communication signal, based at least in part on the different wavelengths of plurality of laser beam and/or an associated voltage bias signal. In some implementations, an input range of the data communication signal may be captured by a linear portion of a transfer function of the electro-optical modulator. In these implementations, a linear portion of a range of the plurality of the modulated optical communication signals may be increased due to wavelength-biasing the electro-optic modulator at different effective bias voltage points for each of the different wavelengths of the plurality of laser beams.

In exemplary embodiments, the electro-optic modulator 525 may be coupled and/or connected to an optical fiber 503. In step 580, in exemplary embodiments, the electro-optic modulator 525 may send the modulated optical communication signal through an optical link in an optical fiber 503 to a receiving device 502. In some implementations, the modulated optical communication signal may be sent utilizing free space optics through a free space link.

In exemplary embodiments, the optical fiber 503 or free space optic link may be communicatively coupled and/or connected to the wavelength division demultiplexer 540. In step 582, in exemplary embodiments, the demultiplexer 540 may receive the multiplexed modulated optical communication signal and may demultiplex the multiplexed modulated optical communication signal into a plurality of received modulated optical communication signals.

In exemplary embodiments, the WDM 540 may be communicatively coupled and/or connected to a plurality of photodetectors 545, 546, 547 and 548. In step 584, in exemplary embodiments, the plurality of photodetectors 545, 546, 547 and 548 may detect the corresponding received plurality of modulated optical communication signals.

In exemplary embodiments, the plurality of photodetectors 545, 546, 547 and 548 may be communicatively coupled and/or connected to corresponding plurality of analog-to-digital converters (ADCs) 550 551 552 and 553. In step 586, the plurality of ADCs 550 551 552 and 553 may convert the detected plurality of received analog modulated optical communication signals into a plurality of digital modulated optical communication signals.

In exemplary embodiments, the plurality of ADCs 550 551 552 553 may be communicatively coupled and/or connected to a thresholding module 555. In step 588, in exemplary embodiments, the thresholding module 555 may perform a threshold operation on the plurality of digital modulated optical communication signals to identify a range between a minimum value and a maximum value, wherein the range corresponds to the linear portion of the transfer function.

In exemplary embodiments, the thresholding module 555 may be communicatively coupled and/or connected to the numerical splicing module 560. In step 590, in exemplary embodiments, the numerical splicing module 560 may numerically splice the received plurality of digital modulated optical communication signals into a final received optical communication signal, wherein the final received signal spans the increased linear portion of the electro-optic modulator 525. In some implementations, the final received signal may be a communication signal, and in some implementations, it may be an optical communication signal.

In exemplary embodiments, the wavelength dependence of the modulator bias point has been quantified previously and the relevant mathematical expressions appear below. The key is how the phase bias depends on the applied bias voltage $V_b$, and the physical path length difference between the two arms of interferometer, $\Delta L$. In the disclosed subject matter, these two degrees of freedom may be used to design a modulator that achieves the desired bias points for each wavelength.

As an example, to create a 4-channel subranging modulator, where the 4 channels cover the entire $V_\pi$ span of input signal, the wavelength induced change in bias point for two neighboring channels may need to be $V_\pi/4$. In some implementations, this value may be smaller if a total span of input signal is less or if a number of wavelengths utilized is a larger number.

In some implementations, the virtual array implementation of the disclosed subject as shown in FIG. 5A and described in FIG. 5B exploits a wavelength dependence of the electro-optic modulator bias to achieve a desired bias point for each wavelength, all in a single electro-optic modulator. The wavelength dependent transfer function of a Mach-Zehnder modulator is given by, $$T(\lambda) = \frac{1}{2}\left[1 + \cos\left(\frac{\pi V_{in}}{V_\pi(\lambda)} + \phi_b(\lambda)\right)\right]$$

where $$\phi_b = 2\pi \frac{\Delta L}{\lambda} + \pi \frac{V_b}{V_\pi}$$

and $V_{in}$ is the electrical voltage (input signal)
$V_\pi$ is the half wave voltage
$\Delta L$ is the internal pathlength difference between the two arms of the interferometer
$\lambda$ is the wavelength
$V_b$ is the DC bias voltage In some implementations, at the (quadrature) operating point, $\phi_b = \pi/2$, a transfer function (e.g., for an electro-optic modulator) may reduce to a sine function, which is approximately linear in the vicinity of the operating point. Hence, for linear modulation, an internal phase bias is set to $\pi/2$ at the operating wavelength. As the wavelength changes, two effects occur: (1) the bias deviates from $V_\pi/2$, and (2) the modulation index, $m = \pi V/V_\pi$, changes because of the changing $V_\pi$.

In an N-channel subranging architecture described herein, a phase excursion, $\phi$, caused by the full range of input signal, may be reduced to by $\phi/N$ and the phase bias of each electro-optic modulator may be shifted by this amount. The equations may be used to realize a virtual electro-optic modulator array implementation of the claimed subject matter as shown in FIGS. 5A and 5B. Thus, with respect to the claimed subject matter, at each wavelength, the electro-optic modulator 525 may be biased at a desired point as required by the subranging operation. In some implementations, there may be an issue where there is a change in a modulation index for different wavelengths.

In some implementations, a change in a modulation index may be addressed in a digital backend of the SEOM system 500 by correcting a digital signal amplitude in individual channels of the receiver section before a thresholding and numerical splicing action is performed by the numerical splicing module 560. FIG. 6 is a block diagram of an amplitude scaling module utilized in an SEOM system according to exemplary embodiments. In some exemplary embodiments, a receiver device 600 of a SEOM modulator may include a plurality of photodetectors 605 606 607 608, a plurality of ADCs 610 611 612 and 613, a digital amplitude scaling module 615, a thresholding module 620 and/or a numerical splicing module 625. In some implementations, the plurality of photodetectors may detect the plurality of modulated optical communication signals at an associated plurality of photodetectors and the plurality of ADCs may convert the detected plurality of received analog modulated optical communication signals into a plurality of received digital modulated optical communication signals using an analog to digital converter. In exemplary embodiments, the digital amplitude scaling module 615 may be communicatively coupled and/or connected to the plurality of ADCs 610 611 612 and 613. In exemplary embodiments, the digital amplitude scaling module 615 may adjust an amplitude of each of the plurality of received digital modulated optical communication signals before performing the threshold operation of the plurality of received digital modulated optical communication signals. After the digital amplitude scaling module 615 has performed the amplitude adjusting process, a thresholding process is performed on the amplitude adjusted plurality of digital modulated optical communication signals and a splicing or fusing process is performed on the plurality of digital modulated optical communication signals to create the final received signal. In some implementations, the final received signal may be a communication signal, and in some implementations, it may be an optical communication signal.

In the disclosed wavelength multiplexed subranging electrooptic modulator (SEOM), each subrange may cover the linear portion of sinusoidal transfer function. The smaller the subrange, the more linearity is achieved, but this comes at an expense of higher number of channels in both the transmitter device and the receiving device. Therefore, there is a tradeoff between linearity and number of channels. If the amount of nonlinearity in each channel is small, then digital post-distortion processing may be used to linearize it. Since the transfer function is a sine function, digital linearization may be achieved by an arcsine function (inverse sine) operation. Alternatively, a more sophisticated linearization algorithm may be used such as the broadband post-distortion technique. FIG. 7 is a block diagram of a digital linearization module utilized in an SEOM system according to exemplary embodiments. In some exemplary embodiments, a receiver device 700 of a SEOM modulator may include a plurality of photodetectors 705 706 707 708, a plurality of ADCs 710 711 712 and 713, a digital linearization module 715, a thresholding module 720 and/or a numerical splicing module 725. In some implementations, the plurality of photo-detectors may detect the plurality of modulated optical communication signals at an associated plurality of photodetectors and the plurality of ADCs may convert the detected plurality of received analog modulated optical communication signals into a plurality of received digital modulated optical communication signals using an analog to digital converter. In exemplary embodiments, the digital linearization module 715 may be communicatively coupled and/or connected to the plurality of ADCs 710 711 712 and 713. In exemplary embodiments, the digital linearization module 715 may apply digital linearization to each of the plurality of received digital modulated optical communication signals before performing the threshold operation the plurality of received digital modulated optical communication signals to achieve further dynamic range enhancement. After the digital linearization module 715 has performed the digital linearization process, a thresholding process is performed on the linearized plurality of digital modulated optical communication signals and a splicing or fusing process is performed on the plurality of digital modulated optical communication signals to create the final received optical communication signal.

Figure 8:
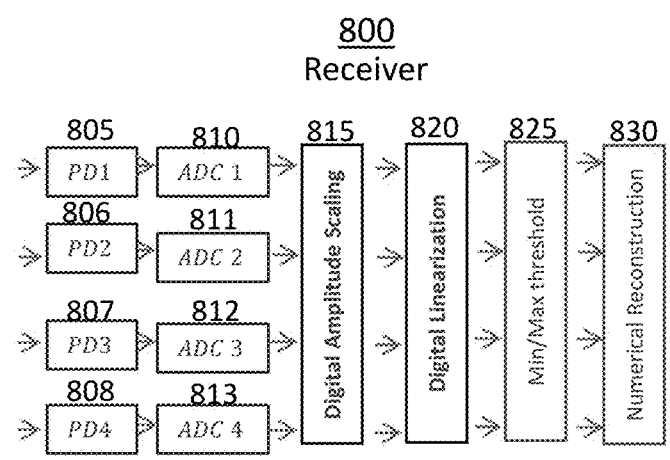
FIG. 8 is a block diagram illustrating a receiver device where the digital amplitude scaling is performed along with the digital linearization process in the digital domain in accordance with exemplary embodiments.

The two digital signal processing steps presented above and illustrated in FIGS. 6 and 7 can be combined together. In this implementation, amplitude scaling is performed to compensate for the wavelength dependence of the modulation index in each channel. Then each channel is digitally linearized before signal reconstruction. FIG. 8 is a block diagram illustrating a receiver device where the digital amplitude scaling is performed along with the digital linearization process in the digital domain in accordance with exemplary embodiments. In FIG. 8, the receiver device may include a plurality off photodetectors 805 806 807 and 809, a plurality of analog-to-digital converters (ADCs) 810, 811, 812 and 813, a digital amplitude scaling module 815, a digital linearization module 820, a thresholding module 825 and a numerical splicing module 830. The processes and/or modules described herein with respect to FIGS. 6, 7 and 8 may be applied with each of the systems, devices and/or methods described in FIGS. 3A, 3B, 4A, 4B, 5A and 5B.

FIG. 9 illustrates a predistortion module in a SEOM system according to exemplary embodiments. In exemplary embodiments, the performance of the subject SEOM system can be enhanced by combining the SEOM system with electronic predistortion. In exemplary embodiments, electronic predistortion offers a cost-efficient solution to extending the dynamic range of electrooptic modulators. The use of predistortion approach may compensate for weak nonlinearities. This technique improves the performance of analog and multilevel optical links by placing a predistortion block to modify the input electrical signal before it is applied to the subranging electrooptic modulator. In exemplary embodiments, the data communication signal (or electrical input $X_{input}$) 905 may be applied to an electronic predistortion block module 910 before the data communication signal is applied to the transmitting device of the wavelength multiplexed subranging electro-optic modulation 915. In exemplary embodiments, electronic linearizers may also compensate for frequency-dependent dynamic nonlinearities. In some implementations, the electronic linearizers may incorporate phase and amplitude filters.

In some implementations, predistortion linearization may include a nonlinear system that is modeled as a memoryless system having second- and third-order nonlinearities. In these implementations, both the nonlinear system and the predistortion block may be modeled using third-order polynomials. FIG. 9 illustrates a predistortion module utilizing the polynomial model for non-linearity. In exemplary embodiments, a data communication signal (or electrical input $X_{input}$) may be input into a predistortion block characteristic equation 920 and a result of this operation is input into a non-linear block characteristic equation 925. In these implementations, an aim of the predistortion block 920 may be to intentionally introduce a distortion in the input signal that cancels the distortion generated by the nonlinear device 925. This may occur when the distortion tones produced by the predistortion block 920 are of equal magnitude but 180 degrees out of phase with those created by the electrooptic modulator. In these implementations, the predistortion linearizer coefficients are chosen or are learned from training data, to achieve a linear overall transfer function.

In exemplary embodiments, the efficiency of electrooptic modulation, i.e., the conversion between the electrical voltage and optical power by an electro-optic modulator, may be determined by the ratio of an input signal voltage amplitude to a half wave voltage, $V_\pi$. In exemplary embodiments, a lower $V_\pi$ leads to a larger modulation depth and a better link gain (and thus lower link loss). In exemplary embodiments, a large $V_\pi$ is undesirable as it limits the information flow from an optical domain to an electrical domain. While the subranging architecture enhances the dynamic range of electrooptic modulation, it does not directly address the modulation depth and hence the link gain. It can enhance link gain indirectly. By mitigating the photodetector saturation problem through its distributed architecture, SEOM can accommodate higher optical powers than a conventional modulator. A higher optical power leads to better link gain.

In exemplary embodiments, an interesting possibility may be to use a modulation index booster in combination with the SEOM system to achieve both a higher electrooptic conversion efficiency and a wider dynamic range. In exemplary embodiments, a modulation booster module or device may be placed after the WDM multiplexer in the transmitting device. In these implementations, the presently described subranging electrooptic modulator (SEOM) may be combined with the modulation booster module or device.

In some implementations, the booster module or device may utilize a special type of optical amplification inserted after the subranging electro-optic modulator device. In some implementations, unlike conventional amplifiers that amplify both the carrier and the sidebands (both the DC and the AC components), this amplifier may only amplify the sideband. In these implementations, the booster module or device may work by seeding a nonlinear phenomenon known as Modulation Instability (MI), or the Benjamin Fair Instability, using intensity modulation sidebands. In these implementations, the booster module or device may increase the amplitude of sidebands, while reducing power in a carrier signal. In these implementations, this combination may increase a modulation depth and effectively reduces the effective half wave voltage. In these implementations, by increasing the modulation depth for a given applied voltage, the booster module or device may enable low-voltage operation. The booster module or device may be utilized to intensity modulated analog links and to digital links that employ return-to-zero modulation format. The combination of the SEOM architecture with the optical sideband amplification module or device has never been contemplated before or described before.

In some implementations, the subranging electro-optic modulation (SEOM) system may be implemented in various integrated circuit optics platforms, including LiNbO3 waveguides, InP waveguides, GaAs waveguides, or silicon photonics. In some implementations, chip scale integration is the preferred embodiment due to the higher complexity of the SEOM system compared to conventional electro-optic modulators. In some implementations, with respect to the LiNbO3 technology, the more recent thin film LiNbO3 (TFLN) is preferred over the traditional thick film technology due to higher waveguide optical confinement which lead to a smaller die area.

In many circumstances, the specification may utilize the term optical communication signals. However, in FIGS. 3A, 3B, 4A, 4B, 5A, 5B, and 6-8, the subject matter is not limited to optical communication signals. In embodiments, the methods, device and systems described herein may be used for wideband signal processing in electronic warfare and countermeasure (SIGINT) and may also be utilized in "FutureG" wireless communication.

In exemplary embodiments, the receiver device of the SEOM systems described herein (and specifically the back-end photodetectors, ADCs, the thresholding module, the numerical splicing or fusing module, the digital amplitude scaling module and the digital linearization module—which perform the digital signal processing) would need to be performed in real-time and/or with low latency. In these exemplary embodiments, the receiver device of the SEOM system may use a field programmable gate array (FPGA). In some implementations, some or all of the components of the receiver device may need to be implemented using a field programmable gate array (FPGA). In some implementations, in addition to the fundamental functions, the digital processing may also include calibration to ensure the transfer function of individual channels are identical after calibration. For high dynamic range, the ADCs may have high resolution. In some implementations, the tradeoff between the ADCs sampling rate and the ADCs resolution may be a limiting factor in the performance of the claimed embodiments.

In exemplary embodiments, a method of electro-optic modulation may include transmitting a plurality of laser beams, each of the plurality of laser beams operating at a different wavelength; delivering the plurality of laser beams to a corresponding plurality of electro-optic modulators; applying a plurality of voltage bias signals to the corresponding plurality of electro-optical modulators; applying a data signal to be modulated at each of the corresponding plurality of electro-optic modulators in parallel; generating a plurality of modulated optical signals at the corresponding plurality of electro-optic modulators based at least in part on the plurality of signal wavelengths, wherein an input range of the data signal is captured by a linear portion of a transfer function of the corresponding plurality of electro-optical modulators and a linear portion of a range of the plurality of modulated optical signals is increased due to a number of the corresponding plurality of electro-optical modulators; and sending the plurality of modulated optical signals through a corresponding plurality of optical links in an optical fiber array, a multi-core fiber or a free space optical link.

In exemplary embodiments, the method of electro-optic modulation may further include detecting the plurality of modulated optical signals at an associated plurality of photodetectors; converting the detected plurality of received analog modulated optical signals into a plurality of received digital modulated optical signals using an analog to digital converter; adjusting an amplitude of each of the plurality of received digital modulated optical signals to compensate for the wavelength dependence of the modulation index and of the photodetector response, and other inter-channel mismatches; performing a threshold operation on the plurality of digital modulated optical signals to identify a range between a minimum value and a maximum value wherein the range corresponds to the linear portion of the transfer function; and splicing or fusing the received plurality of digital modulated optical signals into a final received optical signal, wherein the final received signal spans the linear portion of each modulator of the plurality of electro-optical modulators. In some implementations, the final received signal may be a communication signal or alternatively an optical communication signal.

In one exemplary embodiment, the amplitude of the data signal applied to adjacent electro-optic modulators is adjusted to maintain a modulation index. In exemplary embodiments, the method of electro-optic modulation includes adjusting an amplitude of each of the plurality of received digital modulated optical signals before performing the threshold operation on the plurality of received digital modulated optical signals to compensate for the wavelength dependence of the modulation index and of the photodetector response. In exemplary embodiments, the method of electro-optic modulation includes applying digital linearization to each of the plurality of received digital modulated optical signals before performing the threshold operation the plurality of received digital modulated optical signals to achieve further dynamic range enhancement. In exemplary embodiments, the digital linearization may be performed utilizing an arcsine function operation or by applying a broadband post-distortion operation. In exemplary embodiments, the method of electro-optic modulation includes applying an electronic predistortion process to the data signal before applying the data signal to be modulated to the plurality of electro-optical modulators to extend the dynamic range of the plurality of electro-optical modulators. In exemplary embodiments, the method of electro-optic modulation includes applying a modulation index booster to the plurality of modulated optical signals (after WDM) before sending the plurality of modulated optical signals through the plurality of optical links in the optical fiber.

In exemplary embodiments, a method of electro-optic modulation includes transmitting a plurality of laser beams, each of the plurality of laser beams operating at a different wavelength; delivering the plurality of laser beams to a wavelength division multiplexer and generating a multiplexed optical signal; delivering the multiplexed optical signal to the electro-optic modulator; applying a voltage bias signal to an electro-optical modulator, wherein an effective bias point, considering the effect of wavelength on bias, is different for each different wavelength of the received plurality of laser beams due to the wavelength dependence of the voltage bias signal, with a single modulator behaving as a virtual array of N modulators biased differently due to the variation of the voltage bias across the N wavelengths; applying a data signal to be modulated at the electro-optic modulator; generating a plurality, N, of modulated optical signals at the electro-optic modulator based on N transfer functions corresponding to N wavelengths, wherein an input range of the data signal is captured by a linear portion of a plurality of transfer functions of the electro-optical modulator, and a linear portion of a range of the modulated optical signal is increased due to wavelength-biasing the electro-optic modulator at different effective bias voltage points for each of the different wavelengths of the plurality of laser beams; and sending the modulated optical signal through an optical fiber or a free space optical link to a receiving device.

In exemplary embodiments, the method of electro-optic modulation includes demultiplexing the modulated optical signal with an optical demultiplexer into a plurality of received modulated optical signals; detecting the received plurality of modulated optical signals at an associated plurality of photodetectors; converting the detected plurality of received analog modulated optical signals into a plurality of digital modulated optical signals using one or more analog to digital converters; adjusting an amplitude of each of the plurality of received digital modulated optical signals to compensate for the wavelength dependence of the modulation index, of the photodetector response, and other inter-channel mismatches; performing a threshold operation on the plurality of digital modulated optical signals to identify a range between a minimum value and a maximum value, wherein the range corresponds to the linear portion of the transfer function; and numerically splicing the received plurality of digital modulated optical signals into a final received signal, wherein the final received signal spans the linear portion of the modulator. In some implementations, the final received signal may be a communication signal or alternatively an optical communication signal.

In exemplary embodiments, a transmitting device in a subranging electro-optic modulator (SEOM) system includes one or more laser devices configured to transmit a plurality of laser beams, each of the plurality of laser beams operating at a different wavelength; a plurality of electro-optic modulators, coupled to the one or more laser devices, the one or more laser devices to deliver the plurality of laser beams to the plurality of electro-optic modulators, wherein each of the plurality of electro-optic modulators receives one of the plurality of laser beams; one or more bias voltage generators, coupled to the associated one of the plurality of electro-optic modulators, to apply a plurality of voltage bias signals to the associated one of the plurality of electro-optic modulators; and one or more data devices, coupled to an associated one of the plurality of electro-optic modulators, to apply a data signal to be modulated to the plurality of electro-optic modulators, wherein the plurality of electro-optical modulators are configured to generate an associated plurality of modulated optical signals, based on part on the plurality of bias voltage signals and the different wavelengths of the plurality of laser beams and wherein an input range of the data signal is captured by a linear portion of a transfer function of the corresponding plurality of electro-optic modulators and a linear portion of a range of the plurality of modulated optical signals is increased due to a number of the corresponding plurality of electro-optic modulators. In exemplary embodiments, wherein a plurality of optical fibres or free space optical links coupled to an associated one of the plurality of electro-optic modulators, the plurality of electro-optic modulators to transmit the plurality of modulated optical signals to the associated one of the plurality of optical fibres to the receiving device.

In exemplary embodiments, the transmitting device in a subranging electro-optic modulator (SEOM) system includes an electronic predistortion module, coupled to the data devices, the electronic predistortion module configured to apply an electronic predistortion process to the data signal before applying the data signal to be modulated to the plurality of electro-optic modulators.

In exemplary embodiments, the receiving device in a subranging electro-optic modulator (SEOM) system includes a plurality of photodetectors coupled to an associated plurality of optical fibres, the plurality of photodetectors to detect an associated one of the plurality of modulated optical signals; a plurality of analog-to-digital converters (ADCs), coupled to the associated plurality of photodetectors, the plurality of ADCs configured to convert the detected plurality of received analog or multi-level modulated optical signals into a plurality of received digital modulated signals; an amplitude adjusting module configured to adjust an amplitude of each of the plurality of received digital modulated optical signals to compensate for the wavelength dependent of a modulation index and a photodetector response; a thresholding module, coupled to the plurality of ADCs, the thresholding module configured to perform a thresholding operation to identify a range between a minimum voltage and a maximum voltage, wherein the range corresponding to a linear portion of the transfer function; and a splicing or fusing module, coupled to the thresholding module, the splicing or fusing module configured to splice or fuse the plurality of received digital modulated optical signals into a final received signal, wherein the final received optical signal spans a linear portion of each of a plurality of electro-optic modulators. In some implementations, the final received signal may be a communication signal or alternatively an optical communication signal.

In exemplary embodiments, the receiving device in a SEOM system includes a digital amplitude scaling module, the digital amplitude scaling module coupled to the plurality of ADCs, the digital amplitude scaling module to adjust an amplitude of each of the plurality of received digital modulated optical signals before performing the reconstruction operations. In exemplary embodiments, the receiving device in a SEOM system includes a digital linearization module, the digital linearization module coupled to the plurality of ADCs, the digital linearization module to apply digital linearization to each of the received digital modulated optical signals before performing the thresholding operation, the digital linearization either using an arcsine function or by applying a broadband post-distortion operation to achieve further dynamic range enhancement.

In exemplary embodiments, a transmitting device in a subranging electro-optic modulator (SEOM) system includes one or more laser devices configured to transmit a plurality of laser beams, each of the plurality of laser beams operating at a different wavelength; a wavelength division multiplexer, coupled to the one or more laser devices, to obtain the plurality of laser beams and to generate a multiplexed optical signal; an electro-optic modulator, coupled to the wavelength division multiplexer, to obtain the multiplexed optical signal; a bias voltage generator, coupled to the electro-optic modulator, and to apply a voltage bias signal to the electro-optic modulator, wherein an effective bias point, considering the effect of wavelength on bias, is different for each different wavelength of the received plurality of laser beams due to the wavelength dependence of the voltage bias signal. In exemplary embodiments, the single electro-optic modulator behaves as a virtual array of N modulators biased differently due to a variation of bias across the N wavelengths. In exemplary embodiments, the transmitting device may include a data device, coupled to the electro-optic modulator, the electro-optic modulator to apply a data signal to be modulated at the electro-optic modulator and the electro-optic modulator to generate a plurality, N, of modulated optical signals based on N transfer functions corresponding to N wavelengths, wherein an input range of the data signal is captured by a linear portion of a plurality of transfer functions of the electro-optical modulator, and a linear portion of a range of the modulated optical signal is increased due to wavelength-biasing the electro-optic modulator at different effective bias voltage points for each of the different wavelengths of the plurality of laser beams; and sending the modulated optical signal through an optical channel, such as a fiber or a free space optical link, to a receiving device.

In exemplary embodiments, a receiving device in a subranging electro-optic modulator (SEOM) system includes a wavelength division demultiplexer coupled to the optical fiber, the wavelength division demultiplexer to demultiplex the modulated optical signal with into a plurality of received modulated optical communication signals; an associated plurality of photodetectors, coupled to the wavelength division demultiplexer, the associated plurality of photodetectors to detect the received plurality of modulated optical signals at an associated plurality of photodetectors; a plurality of analog-to-digital converters, coupled to the associated plurality of photodetectors, to convert the detected plurality of received analog modulated optical signals into a plurality of digital modulated optical signals; an amplitude; to adjust an amplitude of each of the plurality of received digital modulated optical signals to compensate for the wavelength dependence of the modulation index and of a photodetector response; a threshold module, coupled to the plurality of analog-to-digital converters, the threshold module to perform a threshold operation on the plurality of digital modulated optical signals to identify a range between a minimum value and a maximum value, wherein the range corresponds to the linear portion of the transfer function; and a splicing or fusion module to numerically splice or fuse the received plurality of digital modulated optical signals into a final received signal, wherein the final received signal spans the linear portion of the modulator. In some implementations, the final received signal may be a communication signal or alternatively an optical communication signal.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, FPGA, GPU, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

As used herein, the term "or" is used inclusively to refer items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A method of electrooptic modulation, employing a distributed subranging architecture and comprising:

transmitting a plurality of laser beams, each of the plurality of laser beams operating at a different wavelength;

delivering the plurality of laser beams to a corresponding plurality of electro-optic modulators;

applying a plurality of voltage bias signals to the corresponding plurality of electro-optic modulators;

applying one data signal to be modulated at each of the corresponding plurality of electro-optic modulators in parallel;

generating a plurality of modulated optical signals at the corresponding plurality of electro-optic modulators based at least in part on the plurality of bias signals and the plurality of wavelengths wherein an input range of the one data signal is captured by a linear portion of a transfer function of the corresponding plurality of electro-optic modulators and a linear portion of a range of the plurality of modulated optical signals is increased due to a number of the corresponding plurality of electro-optic modulators;

sending the plurality of modulated optical signals to a wavelength division multiplexer to generate a multiplexed modulated optical signal; and transmitting the multiplexed modulated optical signal though an optical fibre, or a free space optical communication channel, to a receiving device;

demultiplexing the multiplexed modulated optical signal with an optical demultiplexer to generate a plurality of received modulated optical signals;

detecting the plurality of received modulated optical signals at an associated plurality of photodetectors;

converting the detected plurality of received analog or multi-level modulated optical signals into a plurality of received digital modulated optical signals using an analog-to-digital converter;

performing a threshold operation on the plurality of the received digital modulated optical signals to identify a range between a minimum and a maximum wherein the range corresponds to the linear portion of the transfer function;

splicing or fusing the plurality of received digital modulated optical signals into a final received optical signal, wherein the final received optical signal spans the linear portion of each modulator; and adjusting an amplitude of each of the plurality of received digital modulated optical signals before performing the threshold or reconstruction operations on the plurality of received digital modulated optical signals to compensate for the wavelength dependence of a modulation index, a photodetector response, or other interchannel mismatches.

2. The method of claim 1, further comprising:
using a 2nd harmonic of an RF pilot tone of a bias control circuitry to maintain the plurality of electro-optic modulators biased at a center of the linear portion of the range.

3. The method of claim 1, wherein an amplitude of the data signal applied to adjacent electro-optic modulators is adjusted to maintain a uniform modulation index for all wavelengths of the plurality of laser beams.

4. The method of claim 1, further comprising:
applying digital linearization to each of the plurality of received digital modulated optical signals before performing the threshold operation on the plurality of received digital modulated optical signals to achieve further dynamic range enhancement.

5. The method of claim 4, wherein the digital linearization may be performed utilizing an arcsine function operation or by applying a broadband post-distortion operation.

6. The method of claim 1, wherein employing a plurality of wavelength-multiplexed photodetectors as the plurality of photodetectors achieves efficient RF-to-RF conversion by utilizing high optical power while eliminating the problem of photodetector saturation at high optical powers.

7. The method of claim 1, further comprising:
applying an electronic predistortion process to the one data signal before applying the one data signal to be modulated to the plurality of electro-optic modulators to extend a dynamic range of the plurality of electro-optic modulators.

8. The method of claim 1, further comprising:
applying a modulation index booster to the plurality of modulated optical signals (after wavelength division multiplexing (WDM)) before sending the plurality of modulated optical signals through a plurality of optical links in the optical fibre.

9. A subranging electro-optic modulator (SEOM) system, comprising:
a transmitting device; the transmitting device including:
one or more laser devices configured to transmit a plurality of laser beams, each of the plurality of laser beams operating at a different wavelength;
a plurality of electro-optic modulators, coupled to the one or more laser devices, the one or more laser devices to deliver the plurality of laser beams to the plurality of electro-optic modulators, wherein each of the plurality of electro-optic modulators receives one of the plurality of laser beams;
one or more bias voltage generators, coupled to the associated one of the plurality of electro-optic modulators, to apply a plurality of voltage bias signals to the associated one of the plurality of electro-optic modulators; and
one or more data devices, coupled to an associated one of the plurality of electro-optic modulators, to apply a data signal to be modulated to the plurality of electro-optic modulators, wherein the plurality of electro-optical modulators are configured to generate an associated plurality of modulated optical signals, based in part on the plurality of voltage bias signals and the different wavelengths of the plurality of laser beams, and wherein an input range of the data signal is captured by a linear portion of a transfer function of the corresponding plurality of electro-optic modulators and a linear portion of a range of the plurality of modulated optical signals is increased due to a number of the corresponding plurality of electro-optic modulators;
a plurality of optical fibres coupled to an associated one of the plurality of electro-optic modulators, the plurality of electro-optic modulators to transmit the plurality of modulated optical signals to the associated one of the plurality of optical fibres and to a receiving device; and
the receiving device in the SEOM system including:
a plurality of photodetectors coupled to an associated plurality of optical fibres, the plurality of photodetectors to detect an associated one of the plurality of modulated optical signals;
a plurality of analog-to-digital converters (ADCs), coupled to the associated plurality of photodetectors, the plurality of ADCs configured to convert the detected plurality of received analog or multi-level modulated optical signals into a plurality of received digital modulated optical signals;
an amplitude adjusting module configured to adjust an amplitude of each of the plurality of received digital modulated optical signals to compensate for the wavelength dependence of a modulation index and a photodetector response;
a thresholding module, coupled to the plurality of ADCs, the thresholding module configured to perform a thresholding operation to identify a range between a minimum voltage and a maximum voltage, wherein the range corresponds to a linear portion of the transfer function; and
a splicing or fusing module, coupled to the thresholding module, the splicing or fusing module configured to splice or fuse the plurality of received digital modulated optical signals into a final received optical signal, wherein the final received optical signal spans the linear portion of the transfer function of the corresponding plurality of electro-optic modulators.

10. The SEOM system of claim 9, wherein the transmitting device further includes an electronic predistortion module, coupled to the one or more data devices, the electronic predistortion module configured to apply an electronic predistortion process to the data signal before applying the data signal to be modulated to the plurality of electro-optic modulators.

11. The SEOM system of claim 9, wherein the receiving device further includes a digital amplitude scaling module, the digital amplitude scaling module coupled to the plurality of ADCs, the digital amplitude scaling module configured to adjust an amplitude of each of the plurality of received digital modulated optical signals before performing the thresholding operation.

12. The SEOM system of claim 9, wherein the receiving device further includes a digital linearization module, the digital linearization module coupled to the plurality of ADCs, the digital linearization module configured to apply digital linearization to each of the received digital modulated optical signals before performing the thresholding operation.

13. The SEOM system of claim 12, the digital linearization either using an arcsine function or applying a broadband post-distortion operation to achieve further dynamic range enhancement.

* * * * *